(12) United States Patent
Ma et al.

(10) Patent No.: US 7,530,858 B2
(45) Date of Patent: May 12, 2009

(54) ELECTRICAL JUNCTION SYSTEMS AND METHODS

(75) Inventors: JianFeng Ma, ShenZhen (CN); Peixian Hu, ShenZhen (CN)

(73) Assignee: BizLink Technology, Inc., Fremont, CA (US)

( * ) Notice: Subject to any disclaimer, the term of this patent is extended or adjusted under 35 U.S.C. 154(b) by 0 days.

(21) Appl. No.: 12/101,834

(22) Filed: Apr. 11, 2008

(65) Prior Publication Data

US 2008/0280509 A1 Nov. 13, 2008

(30) Foreign Application Priority Data

May 8, 2007 (CN) .................... 2007 2 0119970 U

(51) Int. Cl.
*H01R 4/48* (2006.01)
(52) U.S. Cl. ...................................... 439/817; 439/837
(58) Field of Classification Search ................. 439/817, 439/181, 837, 729, 909
See application file for complete search history.

(56) References Cited

U.S. PATENT DOCUMENTS

| | | | | |
|---|---|---|---|---|
| 2,701,871 | A | * | 2/1955 | Rauch .......................... 439/817 |
| 3,478,304 | A | * | 11/1969 | Valle ............................ 439/729 |
| 3,806,860 | A | * | 4/1974 | Flammini .................... 439/817 |
| 3,985,415 | A | | 10/1976 | Wolpert |
| 3,989,345 | A | * | 11/1976 | DeVito ........................ 439/729 |
| 4,188,086 | A | | 2/1980 | Inouye |
| 4,540,235 | A | | 9/1985 | Lolic |
| 4,582,380 | A | | 4/1986 | Wilder |
| 4,601,600 | A | | 7/1986 | Karlsson |
| 4,684,183 | A | | 8/1987 | Kinoshita |
| 4,720,276 | A | | 1/1988 | Takahashi |
| 4,802,866 | A | | 2/1989 | Balzano |
| 4,938,702 | A | | 7/1990 | English |
| 5,069,209 | A | * | 12/1991 | Posin ........................... 607/37 |
| 5,098,316 | A | | 3/1992 | Kollmann |
| 5,308,266 | A | * | 5/1994 | Booker ........................ 439/817 |
| 5,573,434 | A | | 11/1996 | Ittah |
| 5,702,266 | A | | 12/1997 | Jones |
| 5,904,589 | A | | 5/1999 | Asakawa |
| 6,196,874 | B1 | | 3/2001 | Wu |
| 6,254,417 | B1 | | 7/2001 | Pan |
| 6,475,027 | B1 | | 11/2002 | Boldt |
| 6,955,570 | B2 | | 10/2005 | Mills |
| 6,957,979 | B2 | | 10/2005 | Welsh |

(Continued)

*Primary Examiner*—Briggitte R Hammond
*Assistant Examiner*—Venessa Girardi
(74) *Attorney, Agent, or Firm*—Law Office of Andrei D. Popovici, P.C.

(57) ABSTRACT

According to some embodiments, a junction assembly comprises a mounting base, a U-shaped front-facing spring clip mounted on the mounting base, a transverse release button passing through the mounting base, and a spring-loaded release check situated under the release button. The spring clip clamps an external conductor onto a conductive fixed support when the mounting base is slid forward along the fixed support. When the junction assembly is in its forward position, the release check abuts a backward-facing surface of the mounting base to block the withdrawal of the mounting base. Pressing the release button pushes down the release check to a level below the mounting base to allow sliding the mounting base backward. Longitudinal guide slots disposed on opposing lateral surface of the mounting base accommodate corresponding guide rails of a conductive fixed support. The assembly allows convenient, tool-less connection/disconnection and provides for a large contact area.

16 Claims, 3 Drawing Sheets

U.S. PATENT DOCUMENTS

| | | |
|---|---|---|
| 7,083,463 B2 | 8/2006 | Steinkemper |
| 7,128,595 B2 | 10/2006 | Boutros |
| 7,241,188 B2 | 7/2007 | Lin |
| 2002/0022413 A1 | 2/2002 | Yeh |
| 2002/0076998 A1 | 6/2002 | Feye-Homann |
| 2005/0014423 A1 | 1/2005 | Roepke |

* cited by examiner

ELECTRICAL JUNCTION SYSTEMS AND METHODS

RELATED APPLICATION DATA

This application is based upon and claims the benefit of priority from prior Chinese Patent Application No. 200720119970.9, filed May 8, 2007, which is herein incorporated by reference.

BACKGROUND

The invention relates to electric power junction devices and methods, and in particular to devices and methods suitable for establishing connections between electrical conductors and electricity sources inside solar energy junction boxes.

Solar energy junction boxes may be placed for example between a solar energy electricity-generating source and solar energy peripheral equipment such as storage batteries. The connections between conductors in solar energy junction boxes and solar energy electricity generating light panels commonly use flat copper conducting wires. One end of the conducting wire may connected to the solar energy electricity source, while the other end of the conducting wire may be connected to the solar energy junction box. Some connection approaches limit the contact area of the connection, and/or require auxiliary tools for connection or disconnection during operation.

SUMMARY

According to one aspect, an assembly comprises a mounting base, a U-shaped front-facing spring clip mounted on the mounting base, a release button coupled to the mounting base and movable along a transverse button-movement direction, and a spring-loaded release check coupled to the release button. The spring clip has an upper spring arm and a lower spring arm configured to clamp an external conductor between the upper spring arm and the lower spring arm when the spring clip is slid over the external conductor along a longitudinal insertion direction. The release check is movable between a check position and a release position in response to a motion of the release button along the button-movement direction. In the check position, the release check abuts a backward-facing surface of the mounting base to block a withdrawal of the mounting base along the longitudinal direction. In the release position, the release check is situated under the mounting base to allow the withdrawal of the mounting base along the longitudinal direction.

According to another aspect, an assembly comprises a conductive fixed support having a pair of longitudinal guide strips, the fixed support comprising a contact surface; a mounting base having a pair of longitudinal guide slots configured to accommodate the longitudinal guide strips, the mounting base being longitudinally slidable along the fixed support, the mounting base having a transverse release-button aperture defined therein and extending between a top surface of the mounting base and a bottom surface of the mounting base, the bottom surface abutting the fixed support; a U-shaped front-facing spring clip mounted on the mounting base, the spring clip having an upper spring arm and a lower spring arm configured to clamp an external conductor between the upper spring arm and the lower spring arm when the spring clip is slid longitudinally over the external conductor, to establish an electrical contact between the external conductor and the contact surface; a release button situated in the release-button aperture; and a spring-loaded release check coupled to the release button and the mounting base, the release check being movable between a check position and a release position in response to a motion of the release button within the release-button aperture, wherein the release check in the check position abuts a backward-facing surface of the mounting base to block a longitudinal withdrawal of the mounting base, and wherein the release check in the release position is situated under the mounting base to allow the longitudinal withdrawal of the mounting base.

According to another aspect, a method comprises electrically connecting an external conductor to a contact surface of a conductive fixed support by sliding a mounting base relative to the fixed support along a longitudinal direction to clamp the external conductor, in contact with the contact surface of the fixed support, between an upper spring arm and a lower spring arm of a front-facing U-shaped spring clip mounted on the mounting base, wherein in a clamping position a spring-loaded release check fits in a check-stop groove of the mounting base to block a withdrawal of the mounting base along the longitudinal direction; and releasing the external conductor by pressing a release button coupled to the mounting base to lower the release check to a position underneath the mounting base to allow a withdrawal of the mounting base along the longitudinal direction, and by withdrawing the mounting base by sliding the mounting base along the longitudinal direction to remove the spring clip from the external conductor.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that any recitation of an element refers to at least one element. A set of elements includes one or more elements. A plurality of elements includes two or more elements. Each recited element/structure can be formed by or be part of a monolithic structure, or be formed from multiple distinct structures. A recitation of two distinct elements does not exclude the two elements forming different parts of a single monolithic structure. Directional terms such as "over" and "under" refer to relative positions between recited elements, are not limited to specific directions defined with respect to the direction of gravity.

Figure 1:
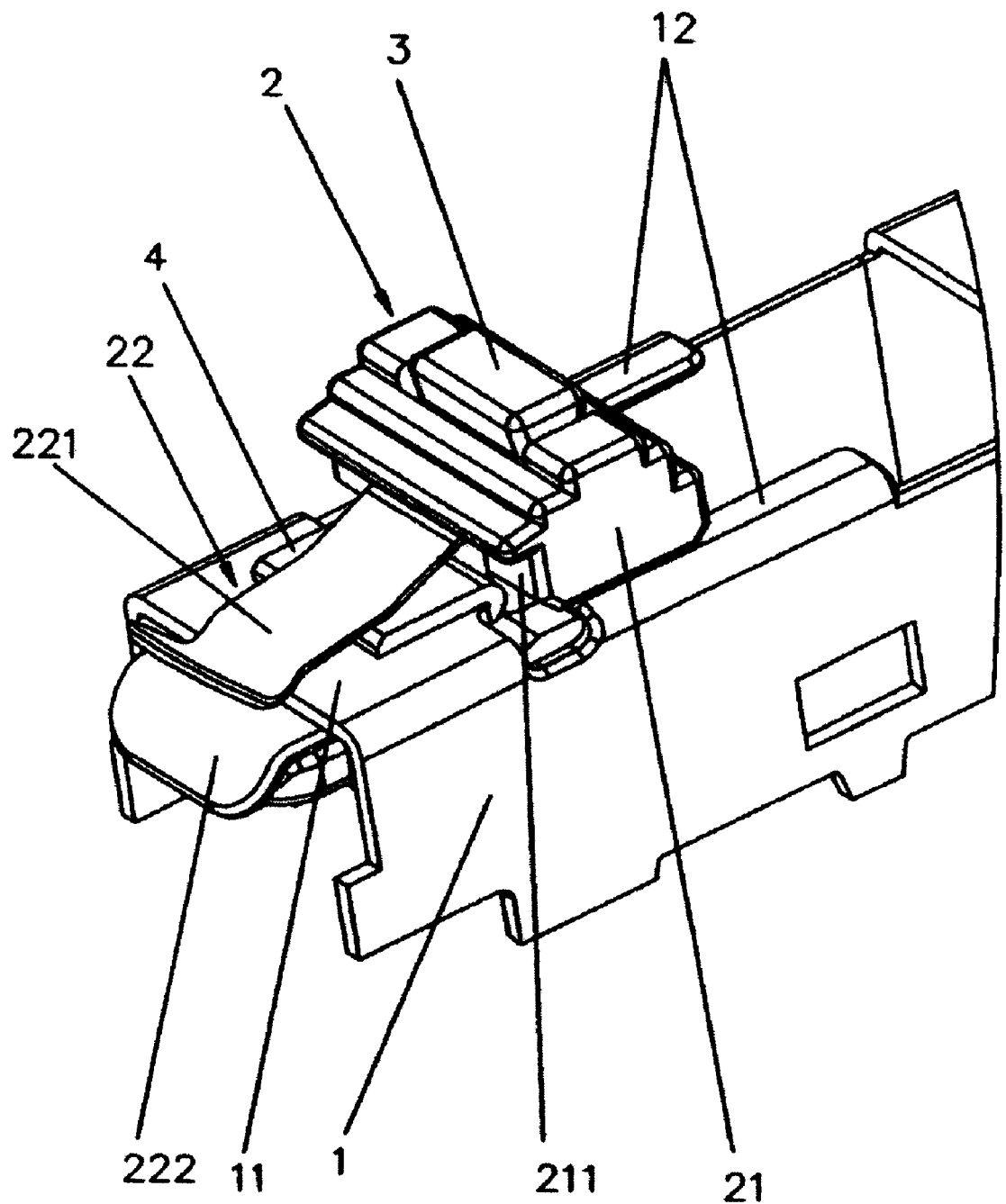
FIG. 1 shows a three-dimensional structural diagram of an assembly according to some embodiments of the present invention.
Figure 3:
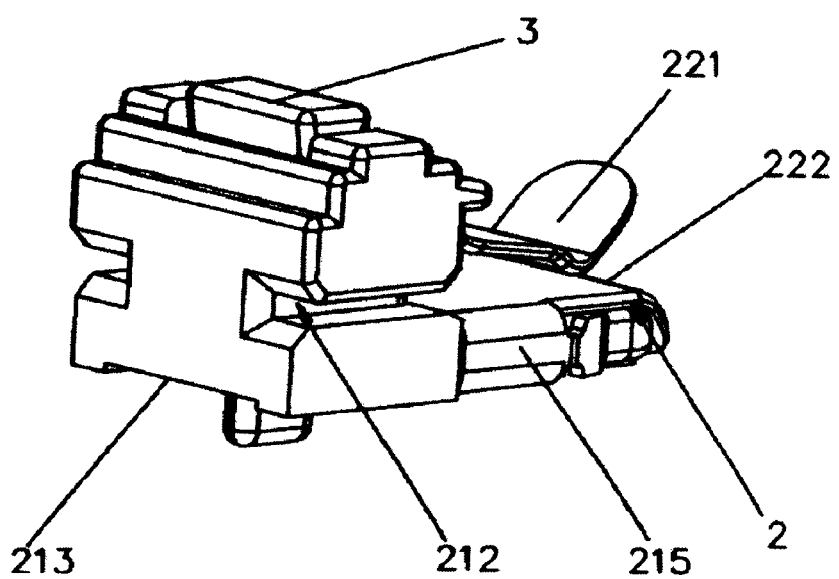
FIG. 3 shows the assembly part of FIG. 2 from a different angle, according to some embodiments of the present invention.
Figure 4:
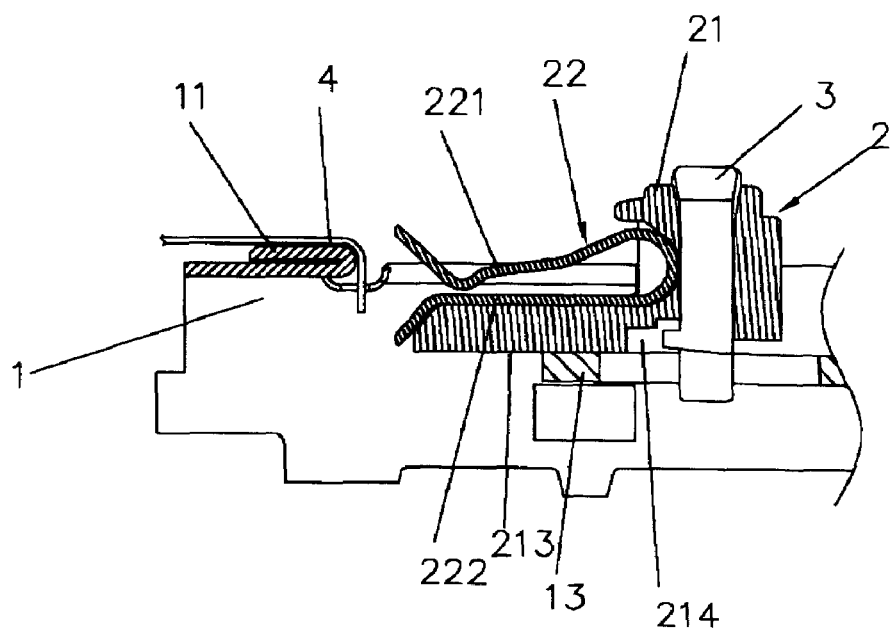
FIG. 4 shows a side sectional view of the assembly of FIG. 1 in a first connection state, according to some embodiments of the present invention.
Figure 5:
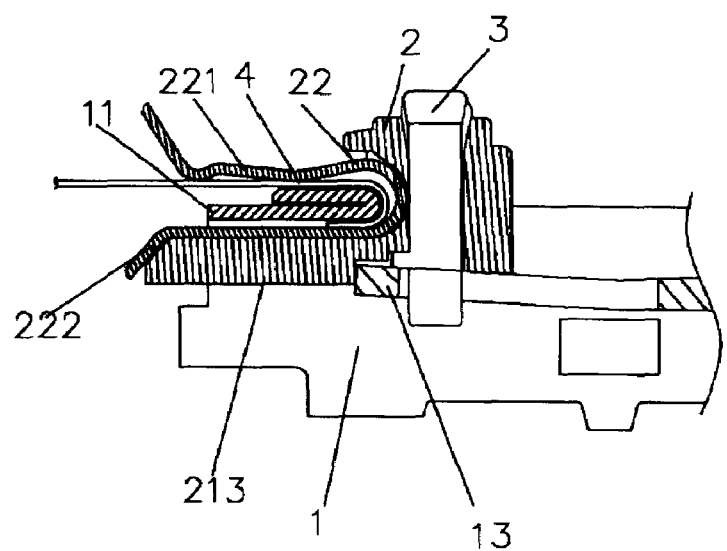
FIG. 5 shows a side sectional view of the assembly of FIG. 4 in a second connection state, according to some embodiments of the present invention.

FIG. 1 show a junction assembly comprising a copper U-shaped fixed conducting support 1 and a junction clamp 2 slidably mounted on support 1. Junction clamp 2 is shown in further detail in FIGS. 2-3. FIGS. 4-5 show the junction assembly in clamped and released states, respectively. The junction assembly is used to clamp a conductive wire 4 around a contact piece 11 of conductive support 1 to establish an electrical connection between conductive wire 4 and conductive support 1, as illustrated in FIGS. 4-5.

Figure 2:
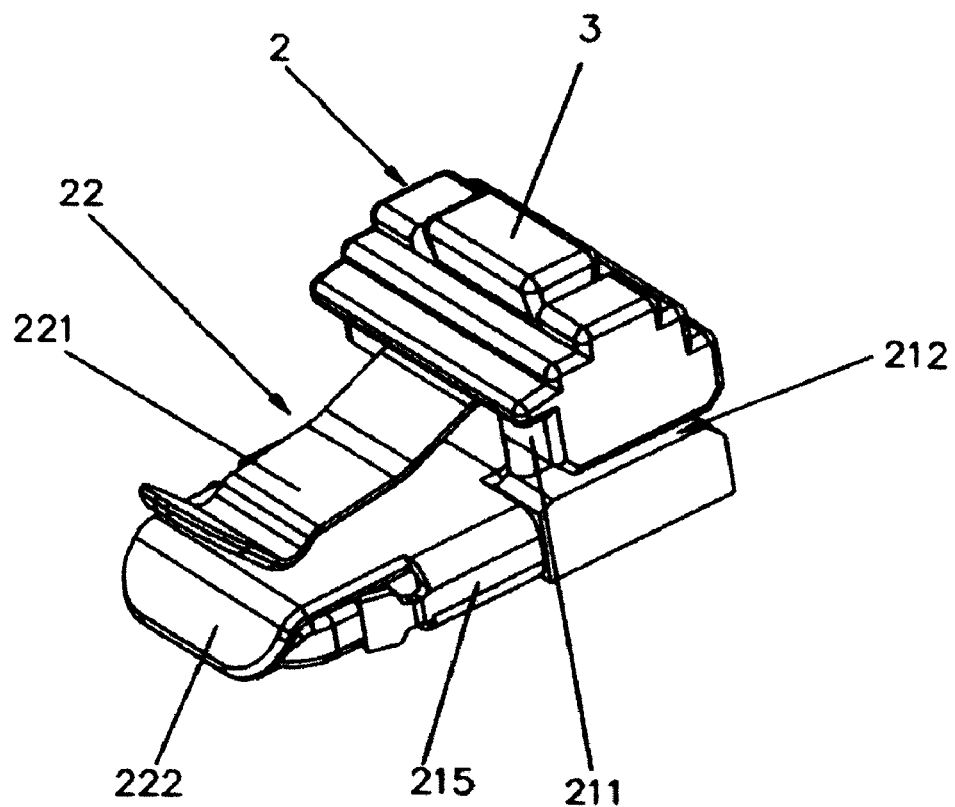
FIG. 2 shows part of the assembly of FIG. 1, according to some embodiments of the present invention.

As shown in FIG. 1, junction clamp 2 comprises a plastic mounting base 21, and a spring clip 22 mounted on a front surface 211 of mounting base 21. Spring clip 22 has an upper spring arm 221 and a lower spring arm 222. Upper spring arm 221 and lower spring arm 222 face forward, and are configured to clamp a contact piece 11 of the front end of support 1. As shown in FIGS. 2-3, a pair of longitudinal guide slots 212 are formed on opposite lateral surfaces (left and right) of mounting base 21. As shown in FIG. 1, a pair of longitudinal guide strips 12 of support 1 are accommodated in the corresponding guide slots 212, to allow mounting base 21 to slide relative to support 1 along a longitudinal insertion direction.

A transverse release-button through-hole (aperture) is defined along a rear region of mounting base 21. The release-button aperture is perpendicular to the longitudinal direction of movement of spring clip 22. A release (check) button 3 is situated within the release-button aperture. As shown in FIGS. 3-5, mounting base 21 has a bottom surface 213. A check stop groove 214 (FIG. 4) is defined along bottom surface 213. A spring-loaded release check 13 is coupled to release button 3, and is movable between a release position and a check position. In the check position (FIG. 5), release check 13 is pushed by its spring to fit into check stop groove 214 (shown in FIG. 4). Release check 13 then abuts a backward-facing surface of mounting base 21, and blocks the withdrawal of the mounting base along the longitudinal insertion direction, as shown in FIG. 5. When button 3 is pushed downward, button 3 causes release check 13 to leave stop check groove 214. With release check 13 underneath mounting base 21, mounting base 21 can be slid backwards relative to support 1, as shown in FIG. 4.

A mounting base front tongue 215, shown in FIGS. 1-3, extends forward from the front surface of the lower portion of mounting base 21. Lower spring arm 222 is disposed on front tongue 215. The front end of lower spring arm 222 bends downward relative to the longitudinal direction, while the front end of upper spring arm 221 bends upward relative to the longitudinal direction.

FIGS. 4 and 5 show side views of the junction assembly of FIG. 1 in a first and a second utilization state, respectively. As shown in FIGS. 4-5, an external conducting wire 4 is placed onto contact piece 11. To establish an electrical connection between contact piece 11 and wire 4, mounting base 21 is pushed forward along support 1. Upper spring arm 221 and lower spring arm 222 clamp wire 4 and cause wire 4 to be bent back around and constrained by contact piece 11. An electrical contact surface is established along both top and bottom sides of conducting wire 4 and contact piece 11.

The exemplary embodiments described above allow conveniently connecting and disconnecting two electrical conductors, while allowing a relatively large contact area between the two conductors. The spring clip clamps the external conductive wire around the conductive piece of the junction assembly, establishing a full electrical contact along both the upper and lower surfaces of the conductive wire and the conductive piece. The described button mechanism allows the convenient control of the insertion and removal of the release check into and out of the mounting base check stop groove. When the mounting base has been pushed forward to clamp the external conducting wire, the release check moves into the check stop groove of the mounting base, preventing the mounting device from being moved backward. In this position, the release button is raised. To disconnect the device, the button is pressed downward, causing the release check piece to leave the check stop groove. An external force is applied to pull the mounting base backward and thus disconnect the device.

It will be clear to one skilled in the art that the above embodiments may be altered in many ways without departing from the scope of the invention. Accordingly, the scope of the invention should be determined by the following claims and their legal equivalents.

What is claimed is:

1. An assembly comprising:
    a mounting base;
    a U-shaped front-facing spring clip mounted on the mounting base, the spring clip having an upper spring arm and a lower spring arm configured to clamp an external conductor between the upper spring arm and the lower spring arm when the spring clip is slid over the external conductor along a longitudinal insertion direction;
    a release button coupled to the mounting base and movable along a button-movement direction generally transverse to the longitudinal direction; and
    a spring-loaded release check coupled to the release button, the release check being movable between a check position and a release position in response to a motion of the release button along the button-movement direction, wherein the release check in the check position abuts a backward-facing surface of the mounting base to block a withdrawal of the mounting base along the longitudinal direction, and wherein the release check in the release position is situated under the mounting base to allow the withdrawal of the mounting base along the longitudinal direction.

2. The assembly of claim 1, further comprising a conductive fixed support having a longitudinal guide strip, the mounting base having a longitudinal guide slot configured to accommodate the guide strip.

3. The assembly of claim 2, wherein the conductive fixed support comprises a contact piece in electrical contact with the external conductor when the external conductor is clamped between the upper spring arm and the lower spring arm.

4. The assembly of claim 1, further comprising a fixed support having a pair of longitudinal guide strips, the mounting base having a pair of longitudinal guide slots facing opposite lateral surfaces of the mounting base and configured to accommodate the pair of guide strips.

5. The assembly of claim 1, wherein the mounting base comprises a front tongue, the lower spring arm being disposed on the front tongue.

6. The assembly of claim 1, wherein a front end of the upper spring arm bends upward relative to the longitudinal insertion direction.

7. The assembly of claim 6, wherein a front end of the lower spring arm bends downward relative to the longitudinal insertion direction.

8. The assembly of claim 1, wherein the mounting base comprises a transverse aperture accommodating the release button.

9. An assembly comprising:
    a conductive fixed support having a pair of longitudinal guide strips, the fixed support comprising a contact surface;
    a mounting base having a pair of longitudinal guide slots configured to accommodate the longitudinal guide strips, the mounting base being longitudinally slidable along the fixed support, the mounting base having a transverse release-button aperture defined therein and extending between a top surface of the mounting base and a bottom surface of the mounting base, the bottom surface abutting the fixed support;

a U-shaped front-facing spring clip mounted on the mounting base, the spring clip having an upper spring arm and a lower spring arm configured to clamp an external conductor between the upper spring arm and the lower spring arm when the spring clip is slid longitudinally over the external conductor, to establish an electrical contact between the external conductor and the contact surface;

a release button situated in the release-button aperture; and a spring-loaded release check coupled to the release button and the mounting base, the release check being movable between a check position and a release position in response to a motion of the release button within the release-button aperture, wherein the release check in the check position abuts a backward-facing surface of the mounting base to block a longitudinal withdrawal of the mounting base, and wherein the release check in the release position is situated under the mounting base to allow the longitudinal withdrawal of the mounting base.

10. A method comprising:

electrically connecting an external conductor to a contact surface of a conductive fixed support by sliding a mounting base relative to the fixed support along a longitudinal direction to clamp the external conductor, in contact with the contact surface of the fixed support, between an upper spring arm and a lower spring arm of a front-facing U-shaped spring clip mounted on the mounting base, wherein in a clamping position a spring-loaded release check fits in a check-stop groove of the mounting base to block a withdrawal of the mounting base along the longitudinal direction; and releasing the external conductor by
  pressing a release button coupled to the mounting base to lower the release check to a position underneath the mounting base to allow a withdrawal of the mounting base along the longitudinal direction, and by
  withdrawing the mounting base by sliding the mounting base along the longitudinal direction to remove the spring clip from the external conductor.

11. The method of claim 10, wherein sliding the mounting base along the longitudinal direction comprises sliding the mounting base relative to the fixed support along a longitudinal guide slot of the mounting base, the longitudinal guide slot accommodating a longitudinal guide strip of the fixed support.

12. The method of claim 10, wherein sliding the mounting base along the longitudinal direction comprises sliding the mounting base along a pair of longitudinal guide slots facing opposite lateral surfaces of the mounting base, the pair of longitudinal guide slots accommodating a corresponding pair of longitudinal guide strips of the fixed support.

13. The method of claim 10, further comprising disposing the lower spring arm on a front tongue of the mounting base.

14. The method of claim 10, wherein a front end of the upper spring arm bends upward relative to the longitudinal direction.

15. The method of claim 14, wherein a front end of the lower spring arm bends downward relative to the longitudinal direction.

16. The method of claim 10, wherein pressing the release button comprises sliding the release button through a transverse aperture defined through the mounting base.

* * * * *